United States Patent [19]
Holland

[11] 3,929,803
[45] Dec. 30, 1975

[54] ARYL CARBOXYLIC ACIDS
[75] Inventor: Gerald F. Holland, Old Lyme, Conn.
[73] Assignee: Pfizer Inc., New York, N.Y.
[22] Filed: May 28, 1974
[21] Appl. No.: 473,742

[52] U.S. Cl..................260/293.62; 260/247.1 R; 260/239 BF; 260/556 C; 424/244; 424/248; 424/267; 424/321
[51] Int. Cl.² ........................................ C07D 295/22
[58] Field of Search.. 260/247.1 R, 239 BF, 293.62, 260/556 C

[56] References Cited
UNITED STATES PATENTS
3,829,467   8/1974   Diamond et al. ............... 260/501.16

*Primary Examiner*—G. Thomas Todd
*Attorney, Agent, or Firm*—Connolly and Hutz

[57] ABSTRACT

2,3-Polymethylene-5-sulfamoylbenzoic acids and the pharmaceutically acceptable salts thereof as hypolipemic agents.

7 Claims, No Drawings

ARYL CARBOXYLIC ACIDS

BACKGROUND OF THE INVENTION

1. Field of the Invention

Atherosclerosis, a form of arteriosclerosis, is characterized by deposition of lipids in the aorta and in the coronary, cerebral and peripheral arteries of the lower extremities. As these masses increase in size, the risk of thrombosis and the ensuing occlusion arises.

Although the etiology of this disease is not fully understood, it has been found that those afflicted with atherosclerosis exhibit elevated levels of plasma lipoprotein, of which cholesterol and triglycerides are the major constituents. In addition to the recommendation that dietary habits leading to lower β-lipoprotein levels be observed, various therapeutic agents such as estrogens, thyroxine analogs, sitosterol preparations and, more recently, Atromid-S (ethyl p-chlorophenoxyisobutyrate) have been used to lower cholesterol levels in individuals prone to the condition.

It has now been discovered that a series of 2,3-polymethylene-5-sulfamoylbenzoic acids are effective agents in reducing plasma lipid levels and can be expected to be useful in the treatment of atherosclerosis and related cardiovascular diseases associated with elevated lipid levels.

2. Description of the Art

Benzoic acid derivatives of a wide variety have been known in the chemical literature for some time and have been reported to possess varied utilities, the most common of which is as intermediates leading to more complicated and diverse chemical structures. For example, 3-chloro-2carboxamidobenzoic acid has been employed in the preparation of tricyclic acridines by Patel, et al., *J. Indian Chem. Soc.*, 34, 371 (1957); C.A. 53, 3818 (1958), while 4-(N-hydroxymethyl)carboxamidobenzoic acid has been used in the synthesis of arylbenzo[e]-1,3-thiazine derivatives by Vinkler, et al., *Acta. Pharm. Hung.*, 31, 75 (1961); C.A. 55, 16554 (1961).

Erlenmeyer, British Pat. No. 802,841; C.A. 53, 11315 (1959), reports the preparation of 4-hydroxy-3-(N-methyl)carboxamidobenzoic acid, claimed to have utility as an analgesic agent, while U.S. Pat. No. 3,725,417 teaches the use of 5-carboxamidobenzoic acids as hypolipemic agents. 2-Substituted-5-sulfamoylbenzoic acids are claimed in Belgium Pat. No. 772,381 as hypolipemic agents.

Interest in 4-hydroxyisophthalic acid derivatives as potential analgesics, diuretics, fungicides, local anesthetics and neuromuscular blocking agents led Gladych, et al., *J. Chem. Soc.*, 4834 (1957) and 2720 (1960), to prepare a wide variety of related analogs including the corresponding 4-alkoxymono- and di-amides thereof.

SUMMARY OF THE INVENTION

It has now been unexpectedly found that compounds of the formula

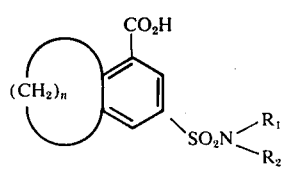

and the pharmaceutically acceptable basic salts thereof wherein $R_1$ is hydrogen or alkyl; $R_2$ is alkyl having 1 to 4 carbon atoms or of the formula

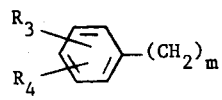

wherein $m$ is an integer of 0 to 3 and $R_3$ and $R_4$ are each hydrogen, methyl, chloro or bromo; $R_1$ and $R_2$ when considered together with the nitrogen to which they are attached form a heterocyclic ring consisting of morpholine, hexamethyleneimine, piperidine or mono- or dimethylpiperidine; and $n$ is an integer of 3 to 5, are hypolipemic agents.

The preferred compounds of the present invention are those congeners wherein $R_1$ is alkyl having 1 to 4 carbon atoms and $R_2$ is of the formula

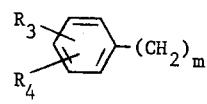

where $m$ is an integer of 0 to 3 and $R_3$ and $R_4$ are each hydrogen, methyl, chloro or bromo and $n$ is an integer of 3 or 4. Also preferred are those analogs where $R_1$ and $R_2$ together with the nitrogen to which they are attached form a dimethylpiperidino ring and $n$ is an integer of 3 or 4.

Compounds also considered within the scope of the present invention include those wherein $R_1$ and $R_2$ together represent a piperidine ring substituted by one or more of the substituents selected from the group consisting of chloro, hydroxy, methoxy, benzyloxy, benzyl, hydroxymethyl and chloromethyl.

Also considered within the purview of the present invention are compounds of the formula

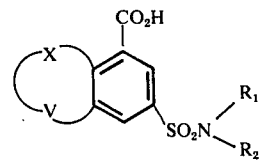

where $R_1$ and $R_2$ are as previously defined, X is —NH—, —O—, —S— or —CH$_2$— and Y is polymethylene or —CH=CH—.

DETAILED DESCRIPTION OF THE INVENTION

In accordance with the process employed for synthesizing the acids of the instant invention, wherein $R_1$, $R_2$ and $n$ are as previously indicated, the following scheme is illustrative:

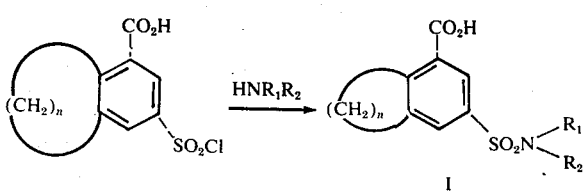

In practice, the sulfonyl chloride is added portionwise to at least one equivalent of the appropriate amine in a water-miscible reaction-inert solvent such as acetone. To assist in completion of said reaction, at least two equivalents of sodium hydroxide, or some other suitable alkali metal or alkali earth metal hydroxide, is added in an aqueous solution at a concentration of approximately 1N to act as a scavenger for the hydrogen chloride formed. As one skilled in the art can readily appreciate, an excess amount of the amide can also be employed as a scavenger. When the amine employed is utilized as an acid addition salt, it is preferred that at least one additional equivalent of inorganic base be used in order that the free amine can be generated.

Reaction time and temperature are not critical since the reaction is generally complete in 30 min. –4 hrs. at ambient temperatures.

At the conclusion of the reaction period, any solids are filtered and the filtrate poured into water and acidified. The precipitated product is then filtered and further purified by recrystallization from a suitable solvent.

The starting sulfonyl chlorides used in the above-described reaction are synthesized by chlorosulfonation of the requisite 2,3-polymethylenebenzoic acids using chlorosulfonic acid, according to well-known literature procedures.

The requisite amines $R_1R_2NH$ employed as starting reagents are either commercially available or can be prepared according to one of the procedures reported by Wagner and Zook, "Synthetic Organic Chemistry", John Wiley and Sons, Inc., New York, N.Y., 1956, page 653.

As has been previously noted, a characteristic feature of the acidic compounds of the instant invention is their ability to form basic salts. Acid congeners of the present invention are converted to basic salts by the interaction of said acid with an appropriate base in an aqueous or non-aqueous medium. Said basic reagents suitably employed in the preparation of said salts can vary in nature, and are meant to contemplate such bases as organic amines, ammonia, alkali metal hydroxides, carbonates, bicarbonates, hydrides and alkoxides, as well as alkali earth metal hydroxides, hydrides, alkoxides and carbonates. Representative of such bases are ammonia, primary amines such as n-propylamine, n-butylamine, aniline, cyclohexylamine, benzylamine, p-toluidine, ethylamine, octylamine, tertiary amines such as diethylaniline, N-methylpyrrolidine, N-methylmorpholine and 1,5-diazabicyclo-[4,3,0]-nonene; sodium hydroxide, potassium hydroxide, ammonium hydroxide, sodium ethoxide, potassium methoxide, magnesium hydroxide, calcium hydride and barium hydroxide.

In the utilization of the chemotherapeutic activity of those compounds of the present invention which form basic salts, it is preferred, of course, to use pharmaceutically acceptable salts. Although water-insolubility, high toxicity, or lack of crystalline nature may make some salt species unsuitable or less desirable for use as such in a given pharmaceutical application, the water-insoluble or toxic salts can be converted to the corresponding acids by decomposition of the salts as described above, or alternately they can be converted to any desired pharmaceutically-acceptable basic salt. The said pharmaceutically-acceptable salts preferred are those wherein the cation is ammonium, sodium or potassium.

Equally as effective as the salts of the acids of the present invention are the corresponding lower alkyl esters. These esters act as pro-drug forms of the corresponding acids, being hydrolyzed in vivo by various esterases.

As previously indicated, the benzoic acids of the present invention are all readily adapted to therapeutic use as hypolipemic agents in mammals. Outstanding for their effectiveness in this regard include the following agents: 6-(N-ethyl-N-[β-p-chlorophenethyl]sulfamoyl)indan-4-carboxylic acid, 6-(cis-3,5-dimethylpiperidinosulfonyl)indan-4-carboxylic acid, 5,6,7,8-tetrahydro-3-(N-ethyl-N-[β-p-chlorophenethyl]sulfamoyl)-1-naphthoic acid and 5,6,7,8-tetrahydro-3-(cis-3,5-dimethylpiperidinosulfonyl)-1-naphthoic acid.

The products of the invention are tested in vivo for hypolipemic activity in rats. Groups, each comprising 4 animals, of normal Sprague-Dawley (Charles River) male rats weighing from 160 to 220 grams are fed rat chow containing the compound under test for two overnight feeding periods. On the morning of the third day the animals are anesthetized and bled from the abdominal aorta. The total plasma cholesterol is then determined by the method of J. J. Carr and I. J. Drekter, reported in *Clin. Chem.*, 2, 353 (1956). Most of the tests are conducted at a feed concentration of 0.15 to 0.25 weight percent of the compound under test, but lower levels, 0.01 to 0.10 weight percent, are employed in some instances where particularly high potency is anticipated. The plasma cholesterol level of the treated animals is found to be significantly reduced when compared to animals not receiving the test compound.

This pharmacological test for measuring hypocholesteremic activity is a reliable indication that similar activity in humans can be expected because those compounds effective in the rat which have been tested in humans have demonstrated similar activity. p-Chlorophenoxyisobutyric acid, ethyl ester, marketed at Atromid-S, a well-known and clinically effective hypocholesteremic agent, causes a 30–35% cholesterol fall in the rat test when administered at a level of 0.25% in the feed.

Although the use of the present invention is directed toward the treatment of mammals in general, the preferred subject is humans. In determining an efficacious dose for human therapy, results of animal testing are frequently extrapolated and a correlation is assumed between animal test behavior and proposed human dosage. When a commercially-employed standard is available, the dose level of the clinical candidate in humans is frequently determined by comparison of its performance with the standard in an animal test. For example, Atromid-S is employed as a standard hypolipemic agent and is administered to humans at the rate of 2.0 g. daily in individual doses. It is assumed, then, that if compounds of the present invention have activity comparable to Atromid-S in the test assay, that similar doses will provide comparable responses in humans.

Obviously, the physician will ultimately determine the dosage which will be most suitable for a particular individual, and it will vary with the age, weight and response of the particular patient as well as with the nature and extent of the symptoms and the pharmacodynamic characteristics of the particular agent to be administered. Generally, small doses will be administered initially, with a gradual increase in the dosage until the optimum level is determined. It will often be found that when the composition is administered orally, larger quantities of the active ingredient will be required to produce the same level as produced by a small quantity administered parenterally.

Having full regard for the foregoing factors it is considered that an effective daily dosage of the compounds of the present invention in humans will generally range from 0.3 to 5 g. per day in single or divided doses. These values are illustrative, and there may, of course, be individual cases where higher or lower dose ranges are merited.

The benzoic acids of this invention can be administered either alone, or, preferably, in combination with a pharmaceutically-acceptable carrier. They may be combined with various pharmaceutically-acceptable, inert carriers in the form of tablets, capsules, lozenges, troches, powders, aqueous suspensions or solutions, elixirs, syrups and the like. Suitable carriers include solid diluents or aqueous media and non-toxic organic solvents. The oral pharmaceutical compositions of this invention may be suitably sweetened and flavored by means of various agents commonly employed for such a purpose.

For parenteral administration, solutions or suspensions of the herein described benzoic acids in sesame or peanut oil or in aqueous propylene glycol solutions can be employed, as well as sterile aqueous solutions of the corresponding water-soluble salts. Such solutions are suitable for intramuscular and subcutaneous administration. Sterile aqueous solutions are additionally useful for intravenous injection, provided that their pH is suitably adjusted and buffered, if necessary, and the liquid diluent rendered isotonic with saline or glucose.

The herein disclosed compounds may also be useful in other aspects of abnormal metabolism, the latter possibly accounting for clinical problems in diabetes, pancreatitis, coronary heart disease, and cerebrovascular disease. Hence the ability of polysubstituted benzoic acids of this invention to regulate lipid metabolism might find utility in the treatment of said disease.

The following examples are provided solely for the purpose of illustration and are not to be construed as limitations of this invention, many variations of which are possible without departing from the spirit or scope thereof.

EXAMPLE 1

6-(cis-3,5-Dimethylpiperidinosulfonyl)indan-4-carboxylic Acid

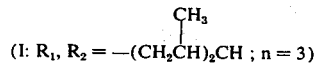

(I: $R_1, R_2 = -(CH_2CH)_2CH$ ; $n = 3$)

A. 6-Chlorosulfonyl-indan-4-carboxylic acid.

A solution of 900 mg. (5.5 m moles) of indan-4-carboxylic acid (Grovannini, et al., *Helv. Chim. Acta.*, 49, 561 [1966]), in 10 ml. of chlorosulfonic acid is heated to 85°C. in an oil bath for 25 min. The reaction is cooled and poured carefully into approximately 100 ml. of ice. The resulting precipitate is filtered, dried (1.3 g.) and employed in subsequent reactions without further purification.

Mass Spectra †: 270. Found: 270.

B. 6-(cis-3,5-Dimethylpiperidinosulfonyl)indan-4-carboxylic acid.

To 900 mg. (6 m moles) of cis-3,5-dimethylpiperidine hydrochloride in 15 ml. of acetone containing 18 ml. of 1N (18 m moles) of aqueous sodium hydroxide is added portion-wise 1.2 g. (4.6 m moles) of 6-chlorosulfonyl-indan-4-carboxylic acid, and the resulting reaction mixture allowed to stir at room temperature for 45 min. The mixture is filtered and the filtrate diluted with 10 ml. of water and acidified with 12N hydrochloric acid to pH 2. The resulting precipitate is filtered and dried to give 1.4 g. of the crude product, m.p. 260°–263°C. Recrystallization from tetrahydrofuran-hexane affords the pure product, 1.0 g., m.p. 263.5°–265°C.

*Analysis:* Calc'd for $C_{17}H_{23}O_4NS$: C, 60.5; H, 6.9; N, 4.2. Found: C, 60.8; H, 7.1; N, 3.8.

EXAMPLE 2

5,6,7,8-Tetrahydro-3-(cis-3,5-dimethylpiperidinosulfonyl)-1-naphthoic acid

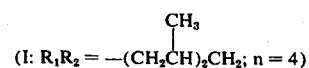

(I: $R_1R_2 = -(CH_2CH)_2CH_2$; $n = 4$)

A. 5,6,7,8-Tetrahydro-3-chlorosulfonyl-1-naphthoic acid.

A mixture of 900 mg. (5 m moles) of 5,6,7,8-tetrahydro-1-naphthoic acid (Inaba, et al., *Bull. Agr. Chem. Soc. Japan*, 20, 42 [1956]) in 5 ml. of chlorosulfonic acid is heated to 95°–97°C. for one hour. The resulting solution is cooled and carefully poured into 75 ml. of ice. The resulting precipitate is filtered and dried 1.2 g., m.p. 173°–177°C.

Mass Spectra M †: 274. Found: 274.

B. 5,6,7,8-Tetrahydro-3-(cis-3,5-dimethylpiperidinosulfonyl)-1-naphthoic acid

To a solution of 900 mg. (6 m moles) of cis-3,5-dimethylpiperidine hydrochloride and 18 ml. of 1N aqueous sodium hydroxide in 15 ml. of acetone is gradually added over a period of 2 min. 1.4 g. (0.018 mole) of 5,6,7,8-tetrahydro-3-chlorosulfonyl-1-naphthoic acid. After stirring at room temperature for 30 min., the reaction mixture is filtered, the solids washed with acetone and the combined filtrate and washing acidified with 12N hydrochloric acid. The precipitated product is filtered and dried, 900 mg., m.p. 239°–241°C.

*Analysis* Calc'd. for $C_{18}H_{25}O_4NS$: C, 61.5; H, 7.2; N, 4.0. Found: C, 61.3; H, 7.0; N, 3.9.

EXAMPLE 3

6,7,8,9-Tetrahydro-3-(cis-3,5-dimethylpiperidinosulfonyl)-1-benzocycloheptene carboxylic acid

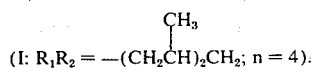

(I: $R_1R_2 = $ —$(CH_2CH)_2CH_2$; $n = 4$).

A. 6,7,8,9-Tetrahydro-3-chlorosulfonyl-1-benzocycloheptene carboxylic acid

To 20 ml. of chlorosulfonic acid is added portion-wise 1.9 g. (0.01 mole) of 6,7,8,9-tetrahydro-1-benzocycloheptene carboxylic acid (Granger, *Compt. rend.*, 252, 1478 [1961], and Daniskefsky, et al., *J. Org. Chem.*, 30, 3676 [1965]), and the resulting solution heated to 80°C. for 30 min. The solution is cooled in an ice bath and poured carefully into 100 ml. of ice and water. The intermediate product is extracted into methylene chloride, the organic layer being dried over anhydrous sodium sulfate. Removal of the solvent under reduced pressure provides the intermediate sulfonyl chloride, which is employed in subsequent reactions without further purification.

B. 6,7,8,9-Tetrahydro-3-(cis-3,5-dimethylpiperidinosulfonyl)-1-benzocycloheptene carboxylic acid A solution of 900 mg. (6 m moles) of cis-3,5-dimethylpiperidine hydrochloride and 18 ml. of 1N (18 m moles) aqueous sodium hydroxide in 20 ml. of acetone is treated portion-wise with 1.44 g. (0.01 mole) of 6,7,8,9-tetrahydro-3-chlorosulfonyl-1-benzocycloheptene carboxylic acid, and the resulting reaction mixture allowed to stir at room temperature for 1 hour. Water (25 ml.) is added and the pH adjusted to 2 by the addition of 12N hydrochloric acid. The resulting precipitated product is filtered, dried and recrystallized from ethanol-water.

EXAMPLE 4

Starting with the appropriate sulfonyl chloride from Examples 1A, 2A and 3A, and following the amination procedures of Examples 1B, 2B or 3B, the following acidic congeners are synthesized:

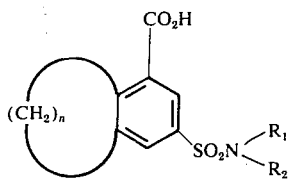

| n | $R_1$ | $R_2$ |
|---|---|---|
| 3 | | —$(CH_2)_5$— |
| 3 | | —$(CH_2)_6$— |
| 3 | | —$(CH_2)_2O(CH_2)_2$— |
| 3 | | —$(CH_2)_2C(CH_3)_2(CH_2)_2$— |
| 3 | | —$(CH_2)_3CH(CH_3)CH_2$— |
| 3 | | —$(CH_2)_4CH(CH_3)$— |
| 3 | | —$(CH_2)_2CH(CH_3)CH(CH_3)CH_2$— |
| 3 | | —$(CH_2)_2CH(CH_3)(CH_2)_2$— |
| 4 | | —$(CH_2)_5$— |
| 4 | | —$(CH_2)_2O(CH_2)_2$— |
| 4 | | —$(CH_2)_3C(CH_3)_2CH_2$— |
| 4 | | —$(CH_2)_2C(CH_3)_2(CH_2)_2$— |
| 4 | | —$(CH_2)_6$— |
| 4 | | —$(CH_2)_3CH(CH_3)CH_2$— |
| 4 | | —$(CH_2)_2CH(CH_3)(CH_2)_2$— |
| 5 | | —$(CH_2)_5$— |
| 5 | | —$(CH_2)_6$— |
| 5 | | —$(CH_2)_2O(CH_2)_2$— |
| 5 | | —$(CH_2)_2CH(CH_3)(CH_2)_2$— |
| 5 | | —$(CH_2)_2C(CH_3)_2(CH_2)_2$— |
| 5 | | —$(CH_2)_3CH(CH_3)CH_2$— |

EXAMPLE 5

5,6,7,8-Tetrahydro-3-[N-ethyl-N-(2-p-chlorophenethyl)sulfamoyl]-1-naphthoic acid (I: $R_1 = C_2H_5$; $R_2 = $ p-$ClC_6H_4CH_2CH_2$-; $n = 4$).

To 1.1 g. (5 m moles) of N-ethyl 2-p-chlorophenethyl amine in 10 ml. of acetone and 15 ml. of 1N sodium hydroxide solution is added portion-wise over a 2 min. period 1.26 g. (4.6 m moles) of 3-chlorosulfonyl-1-naphthoic acid, and the resulting reaction mixture allowed to stir at room temperature for 1 hour. The pH of the reaction is adjusted to 2 with 12N hydrochloric acid and 100 ml. of water added. The desired crude product is filtered, dried and, finally, recrystallized from benzene-hexane, 850 mg., m.p. 171°–175°C. The analytical sample is recrystallized from benzene, m.p. 174°–176°C.

*Analysis* Calc'd for $C_{21}H_{24}O_4NSCl$: C, 59.8; H, 5.7; N, 3.3 Found: C, 59.5; H, 5.8; N, 3.0.

EXAMPLE 6

The procedure of Example 5 is again repeated, starting with the requisite sulfonyl chloriide and amine, to provide the following products:

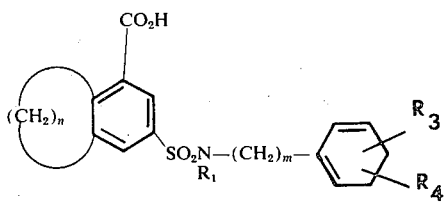

| n | $R_1$ | $R_3$ | $R_4$ | m |
|---|---|---|---|---|
| 3 | H— | 3—Cl— | 4—Br— | 0 |
| 3 | $CH_3$— | 3—$CH_3$— | 4—Br—0 | |
| 3 | H— | H— | H— | 1 |
| 3 | $CH_3$— | 2—$CH_3$— | 4—$CH_3$— | 1 |
| 3 | $C_2H_5$— | H— | 4—Cl— | 2 |
| 3 | $CH_3$— | H— | 3—Cl— | 3 |
| 4 | n—$C_3H_7$— | H— | 4—$CH_3$— | 0 |
| 4 | n—$C_3H_7$— | 2—Cl— | 4—Cl— | 0 |
| 4 | $C_2H_5$— | H— | H— | 1 |
| 4 | $C_2H_5$— | H— | 4—Cl— | 1 |
| 4 | t—$C_4H_9$— | H— | H— | 3 |
| 4 | $CH_3$— | 2—$CH_3$— | 4—Cl— | 3 |
| 5 | H— | 3—Cl— | 4—Br— | 0 |
| 5 | $CH_3$— | 3—$CH_3$— | 4—Br— | 0 |
| 5 | $C_2H_5$— | H— | H— | 1 |
| 5 | i—$C_3H_7$— | H— | 4—Cl— | 1 |
| 5 | $C_2H_5$— | H— | 4—Cl— | 2 |
| 5 | H— | H— | 3 | |
| 5 | $CH_3$— | 2—$CH_3$— | 4—Cl— | 3 |

EXAMPLE 7

6-(Diethylsulfamoyl)indan-4-carboxylic Acid (I: $R_1,R_2 = C_2H_5$; $n = 3$)

6-Chlorosulfonyl-indan-4-carboxylic acid (2.4 g., 9.2 m moles) is added portion-wise to a solution of 1.3 g. (12 m moles) of diethylamine hydrochloride in 30 ml. of acetone and 36 ml. of 1N (36 m moles) of aqueous sodium hydroxide, and the resulting reaction mixture allowed to stir at room temperature for 1.5 hrs. The mixture is diluted with 50 ml. of water and acidified to pH 2 with 12N hydrochloric acid. The precipitated product is filtered, dried and recrystallized from benzene-hexane.

EXAMPLE 8

Starting with the appropriate sulfonyl chloride and requisite amine, and repeating the procedure of Example 2, the following congeners are prepared:

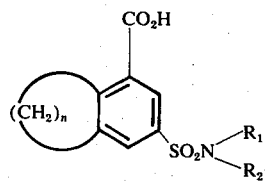

| R₁ | R₂ | m |
|---|---|---|
| H— | CH₃— | 3 |
| H— | i—C₃H₇— | 3 |
| H— | t—C₄H₉— | 3 |
| CH₃— | C₂H₅— | 3 |
| i—C₃H₇— | i—C₃H₇— | 3 |
| H— | C₂H₅— | 4 |
| CH₃— | CH₃— | 4 |
| C₂H₅— | C₂H₅— | 4 |
| n—C₃H₇— | C₂H₅— | 4 |
| n—C₄H₉— | n—C₄H₉— | 4 |
| H— | n—C₄H₉— | 5 |
| H— | t—C₄H₉— | 5 |
| CH₃— | CH₃— | 5 |
| C₂H₅— | n—C₃H₇— | 5 |
| t—C₄H₉— | t—C₄H₉— | 5 |

EXAMPLE 9

Groups, each comprising 4 animals, of normal (Sprague-Dawley Charles River) rats weighing from 160–220 gramss are fed rat chow containing the test compounds for two overnight feeding periods. On the morning of the third day the animals are anesthetized and bled from the abdominal aorta. The total plasma cholesterol is then determined by the method of J. J. Carr and I. J. Drekter reported in *Clin. Chem.*, 2, 353 (1956). Most of the tests are conducted at a concentration in the feed of 0.15 to 0.25 weight percent of the compound under test, but lower levels are employed in some instances. The total quantity of test compound consumed is computed from feed consumption over the two-day period and is tabulated, in milligrams per kilogram body weight per day, along with the associated percent cholesterol fall measured:

| Compound | % Cholesterol Fall | Daily Dose mg./kg. |
|---|---|---|
| 6-(cis-3,5-dimethylpiperidinosulfonyl)indan-4-carboxylic acid | 37 | 222 |
| 5,6,7,8-tetrahydro-3-(cis-3,5-dimethylpiperidinosulfonyl)-1-naphthoic acid | 23 | 88 |
| 5,6,7,8-tetrahydro-3-[N-ethyl-N-(2-p-chlorophenethyl)sulfamoyl]-1-naphthoic acid | 20 | 69 |

EXAMPLE 10

A dry solid pharmaceutical composition is prepared by combining the following materials in the indicated weight proportions:

| | |
|---|---|
| 6-(cis-3,5-dimethylpiperidinosulfonyl)indan-4-carboxylic acid | 50 |
| calcium carbonate | 20 |
| propylene glycol, average molecular weight 4000 | 30 |

The dry mixture is thoroughly agitated to obtain a completely uniform blend. Soft elastic and hard gelatin capsules containing this composition are then prepared employing sufficient material to provide each capsule with 190 mg. of active ingredient.

EXAMPLE 11

A dry solid pharmaceutical composition is prepared by blending the following materials together in the specified weight proportions:

| | |
|---|---|
| 5,6,7,8-tetrahydro-3-(cis-3,5-dimethylpiperidinosulfonyl)-1-naphthoic acid | 50 |
| sodium citrate | 25 |
| alginic acid | 10 |
| polyvinylpyrrolidone | 10 |
| magnesium stearate | 5 |

After the dried composition is thoroughly blended, tablets are punched from the mixture, each tablet being of such size as to contain 100 mg. of the active ingredient. Tablets are also prepared containing, respectively, 5, 10, 25 and 50 mg. of the active ingredient, by employing the appropriate proportions of 5,6,7,8-tetrahydro-3-(cis-3,5-dimethylpiperidinosulfonyl)-1-naphthoic acid and the excipient blend in each case.

EXAMPLE 12

6-(cis-dimethylpiperidinosulfonyl)indan-4-carboxylic acid

Sodium Salt

To a solution of 400 mg. (0.01 mole) of sodium hydroxide in 30 ml. of water is added, in portions and with stirring, 3.37 g. (0.01 mole) of 6-(cis-3,5-dimethylpiperidinosulfonyl)indan-4-carboxylic acid. The slightly hazy solution is filtered and the filtrate concentrated at room temperature and under reduced pressure to dryness. The residual sodium salt is triturated with acetone and filtered.

In like manner, the pharmaceutically acceptable alkali and alkaline-earth metal salts of the present invention are prepared.

EXAMPLE 13

5,6,7,8-Tetrahydro-3-(4,4-dimethylpiperidinosulfonyl)-1-naphthoic acid Diethylamine Salt To a solution of 3.5 g. (0.01 mole) of 5,6,7,8-tetrahydro-3-(4,4-dimethylpiperidinosulfonyl)-1-naphthoic acid in 30 ml. of methanol is added 1 g. of diethylamine in 5 ml. of methanol. After several minutes of stirring, the solvent and excess amine are removed under reduced pressure and the residue triturated with diethyl ether. The diethylamine salt is subsequently filtered and dried.

By employing a similar procedure, the pharmaceutically acceptable organic amine salts and ammonium salt of the present invention are synthesized.

What is claimed is:

1. A compound selected from those of the formula

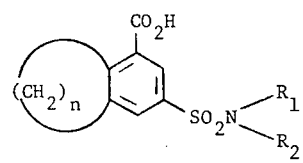

and the pharmaceutically acceptable basic salts thereof wherein
  $R_1$ is selected from the group consisting of hydrogen and alkyl having 1 to 4 carbon atoms;
  $R_2$ is selected from the group consisting of alkyl having 1 to 4 carbon atoms and

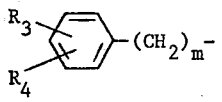

wherein $m$ is an integer of 0 to 3 and $R_3$ and $R_4$ are each selected from the group consisting of hydrogen, methyl, chloro and bromo;
  $R_1$ and $R_2$ when considered together with the nitrogen atom to which they are attached form a heterocyclic ring selected from the group consisting of morpholino, hexamethyleneimino, piperidino and mono- and dimethylpiperidino; and
  $n$ is an integer of 3 to 5.

2. A compound of claim 1 wherein $R_1$ is alkyl having from 1 to 4 carbon atoms.

3. The compound of claim 2 wherein $n$ is an integer of 3, $R_1$ is ethyl and $R_2$ is β-(p-chlorophenethyl).

4. The compound of claim 2 wherein $n$ is an integer of 4, $R_1$ is ethyl and $R_2$ is β-(p-chlorophenethyl).

5. A compound of claim 1 wherein $R_1$ and $R_2$ when considered together with the nitrogen to which they are attached form a dimethylpiperidino heterocyclic ring.

6. The compound of claim 5 wherein $n$ is an integer of 3 and $R_1$ and $R_2$ are 3,5-cis-dimethylpiperidino.

7. The compound of claim 5 wherein $n$ is an integer of 4 and $R_1$ and $R_2$ and 3,5-cis-dimethylpiperidino.

* * * * *